Figure 1A:
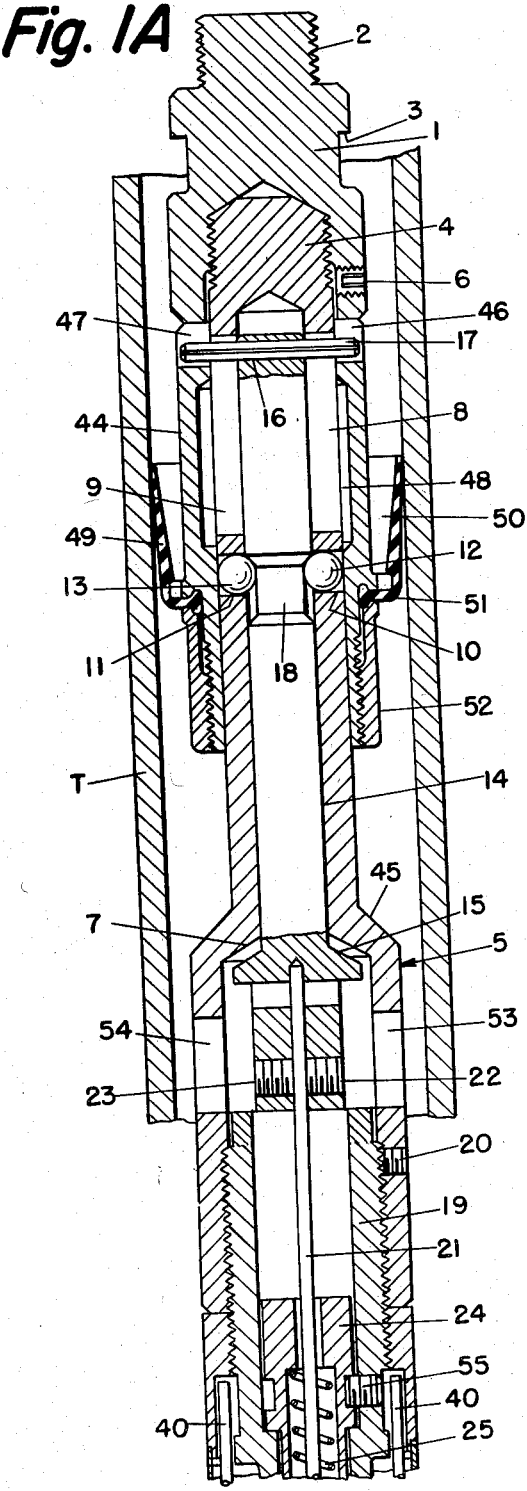

Aug. 2, 1960 W. G. BOYLE 2,947,086
RELEASE ASSEMBLY FOR TUBING CALIPER
Filed Oct. 28, 1958 2 Sheets-Sheet 1

INVENTOR.
WILLIAM G. BOYLE
BY
ATTORNEY

Aug. 2, 1960  W. G. BOYLE  2,947,086
RELEASE ASSEMBLY FOR TUBING CALIPER
Filed Oct. 28, 1958  2 Sheets-Sheet 2
Fig. 2A
Fig. 2B
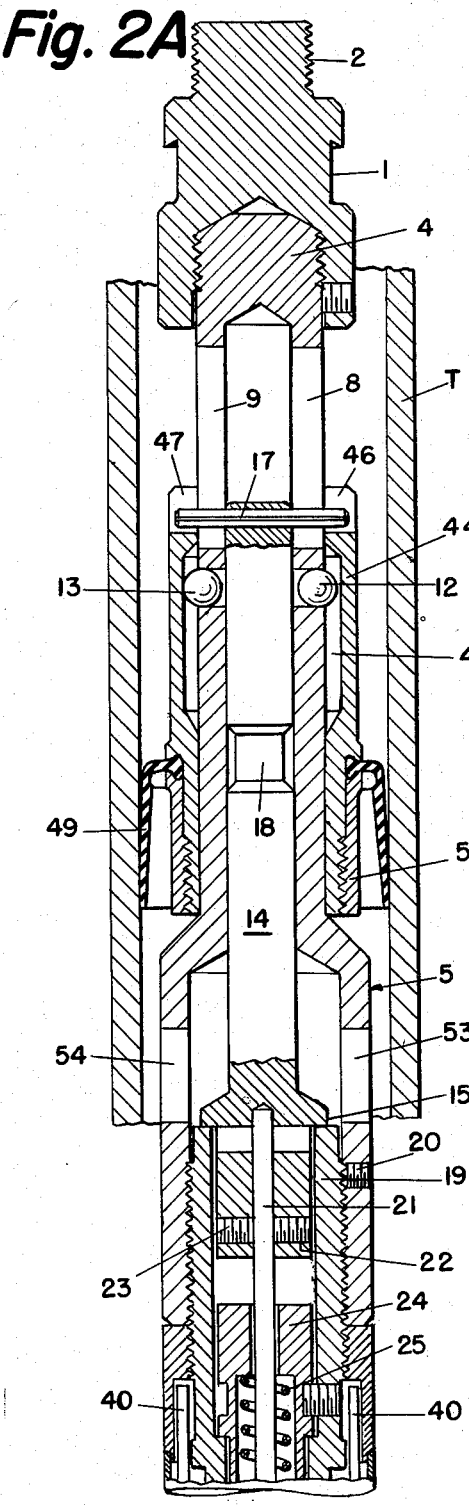
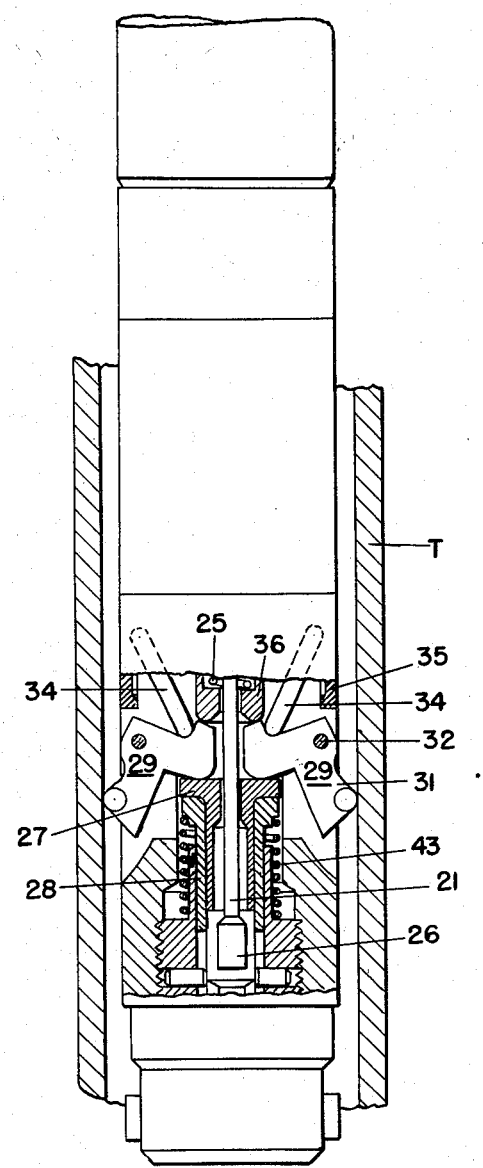
INVENTOR.
WILLIAM G. BOYLE
BY
ATTORNEY

United States Patent Office 2,947,086
Patented Aug. 2, 1960

2,947,086

RELEASE ASSEMBLY FOR TUBING CALIPER

William G. Boyle, Dallas, Tex., assignor to Otis Engineering Corporation, Dallas, Tex., a corporation of Delaware Filed Oct. 28, 1958, Ser. No. 770,039

16 Claims. (Cl. 33—178)

This invention relates to a release assembly operable from a remote point for releasing a plunger for movement from a first position (in which it is originally locked) to a second position, and more particularly to a release assembly operable remotely for releasing the feelers of a tubing caliper for movement from an original, inoperative position to an operative position.

When a tubing caliper such as that described in Fredd United States Patent Number 2,708,316 is run into an extended length of tubing, it is highly desirable that the feelers (which during the calipering operation engage the tubing wall) be retained in a feeler-retracted position, to prevent unnecessary contact between the tubing wall and the feelers as the caliper moves downwardly in the tubing. This will eliminate unnecessary wear on the feeler heads. However, when the caliper has been lowered to the desired level in the tubing, it is necessary to release the feelers to a feeler-extended position, in order that the feelers can contact the tubing wall to caliper it as the caliper is retracted therefrom. This releasing action must of necessity be initiated from a remote point, since the tubing caliper is not accessible when it is inside an extended length of tubing.

Prior release mechanisms for the feelers have required contact with the inner wall of the tubing, and specifically with recessed joints in the tubing, in order to bring about a releasing action, for permitting the feelers to move to an operative or feeler-extended position. However, in certain types of tubing recessed joints are absent, and in other types of tubing (for example, plastic-coated tubing) it is undesirable for the release mechanism to contact the tubing wall, since such contact would tend to damage the coating.

An object of this invention is to provide an improved release mechanism, operable from a remote point, for releasing the feelers of a tubing caliper for movement to a feeler-extended position.

Another object is to provide a novel release mechanism for tubing calipers, which operates to positively lock the feelers thereof in a feeler-retracted position.

Still another object is to provide a release mechanism for tubing calipers, which operates to release the feelers thereof for movement from the retracted position upon upward movement of the release assembly within the tubing, without the necessity of any mechanical co-action or engagement between the release assembly and the tubing.

The objects of this invention are accomplished, briefly, in the following manner: a body member, of essentially cylindrical configuration, is adapted to be secured at its lower end to the body portion of a feeler head assembly, such as that described in the aforementioned United States Fredd patent, and at its upper end secured to a conventional fishing neck. Slidably mounted within this body member is a plunger, to the lower end of which is secured a feeler controlling member which is coupled to the feeler head assembly, the arrangement here being such that downward movement of the plunger (and thereby also of the controlling member) with respect to the body member permits movement of the feelers to feeler-extended position, that is, to a position wherein the feelers contact the tubing wall. A movable locking member originally locks together the body member and the plunger member, this locking member being originally held in its locking position by means of a sleeve slidably mounted on the body member. The sleeve is capable of movement downwardly on the body member to a position wherein the locking member is released from the plunger, thereby allowing the plunger to move downwardly so as to permit the feelers to move to feeler-extended position. A cup-shaped member opening upwardly is secured at its base to the sleeve. This latter member is adapted to serve as an inertially-operated means, in conjunction with the fluid in the tubing, for moving the sleeve downwardly in response to a sudden upward pull of the caliper. The cup-shaped member, filled with fluid, offers a high resistance to upward movement, so that the sleeve is caused to slide downwardly on the body member, as the latter moves upwardly. This releases the locking member from the plunger, and the latter moves downwardly to permit the feelers to move to feeler-extended position. During this original or later upward displacement of the caliper in the tubing, the cup-shaped member rolls over on itself, so that its upper end is then pointed downwardly. This prevents any swabbing of the tubing as the caliper is drawn upwardly, thereby allowing easy upward travel of the caliper in the tubing.

Figure 1B:
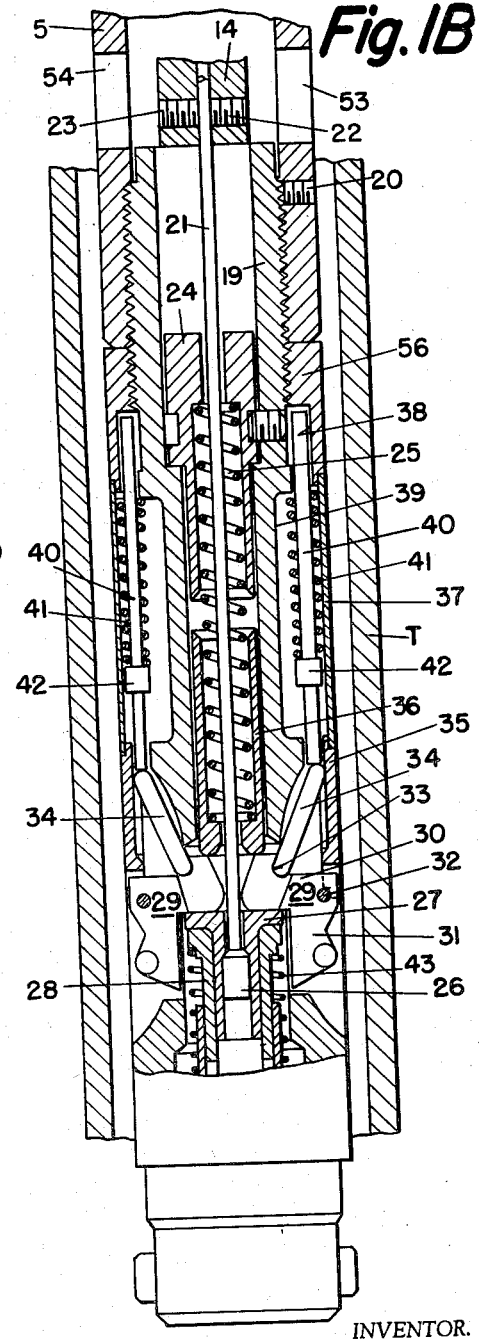

A detailed description of the invention follows, taken in conjunction with the accompanying drawings, wherein:

Figures 1A and 1B, taken together, comprise a longitudinal cross-section of a tubing caliper release assembly according to this invention, the parts being shown in the locked or feeler-retracted position; and Figures 2A and 2B, taken together, comprise a view similar to Fig. 1, but showing the parts in the released or feeler-extended position.

The release assembly of this invention is intended to replace the release head assembly A of the aforementioned United States patent, which latter assembly is shown connected to the feeler head assembly B of the same patent. For purposes of simplification, only so much of the complete tubing caliper is shown as is necessary for an understanding of the present invention. For further details, reference should be made to the aforementioned United States Fredd patent.

A more or less conventional fishing neck 1 has a threaded portion 2 at its upper end, for attachment to an ordinary wire line assembly, and has an undercut shoulder 3, by means of which the caliper device may be fished from the well, if such is necessary. The fishing neck 1 has at its lower end a centrally-located tapped aperture, into which is threaded the upper end 4 of an essentially cylindrical body member 5. This threaded connection of the body member 5 to the fishing neck 1 is secured by a setscrew 6 which threadedly engages the cylindrical wall of the fishing neck and bears against the end 4 of body 5.

Body member 5 is drilled and tapped, and has a substantially uniform internal longitudinal bore extending from a point about even with the lower end of neck 1 to a downwardly and outwardly sloped internal shoulder 7. A pair of diametrically-opposed elongated slots 8 and 9 are cut entirely through the wall of body member 5, these slots extending from a point just below the upper end of the internal bore in member 5, downwardly for a considerable distance. Just below the lower ends of these slots, body member 5 has two diametrically-opposed apertures 10 and 11 whose diameters are each somewhat greater than the wall thickness of body 5, Apertures 10 and 11 extend entirely through the wall of member 5. It will be noted that the slots 8 and 9, and also the apertures 10 and 11, are all located in the uniform-internal-bore portion of body member 5. A hard metallic spherical ball 12 is positioned and snugly seated in aperture 10, and a similar metallic ball 13 is positioned and snugly seated in aperture 11. The diameter of each of these balls is substantially equal to the diameter of the corresponding aperture 10 or 11, and is somewhat greater than the wall thickness of body member 5. Thus, the balls 12 and 13 are mounted in the respective apertures 10 and 11, but extend sideways beyond one or the other (that is, the inner or the outer) cylindrical surface of body 5.

A cylindrical plunger 14 is slidably disposed in the internal bore of body 5, this plunger having near its lower end a downwardly and outwardly extending annular flange 15. Flange 15 is adapted to engage the shoulder 7 of the body, to limit the upward movement of plunger 14 in body 5. Plunger 14 has a transverse aperture 16 therein adjacent its upper end, in which is rigidly secured a pin 17. This pin has a length and diameter such as to protrude through the slots 8 and 9 of body 5. The engagement of pin 17 with the upper and lower edges of the parallel and co-extensive slots 8 and 9 helps to limit the longitudinal displacement of plunger 14 in body 5, and tends to prevent removal of the plunger from the body. The plunger has an annular groove 18 therein, into which the balls 12 and 13 can partially extend.

Figure 1 shows the various parts of the release assembly of this invention in the locked or feeler-retracted position, in which position the feelers are held while the tubing caliper is lowered down the tubing string, and until the survey or calipering is to begin. The body 5 is internally threaded at its lower end, and the feeler head body 19 has at its upper end external threads which engage the internal threads of body 5 to secure head body 19 in position in body 5. This threaded connection of body 19 to body 5 is secured by a setscrew 20 which threadedly engages the lower cylindrical wall of body 5 and bears against the upper end of body 19. The lower end of plunger 14 has a longitudinal bore therein for receiving the release rod 21 of the feeler head assembly of the caliper. The rod 21 is secured in the lower end of plunger 14 by means of setscrews 22 and 23 which threadedly engage the cylindrical wall of plunger 14 and bear against the upper end of rod 21.

The body 19 has a central longitudinal bore extending entirely therethrough. A release bushing 24 is retained in position in this bore, near the upper end thereof, by means of a setscrew 55 which threadedly engages the wall of body 19 and extends into a circumferential slot in bushing 24. The release rod 21 slidably extends through bushing 24. This bushing provides an upper abutment for the centering spring 25. The release rod 21 extends downwardly to terminate in a head 26 which extends through the central bore in a bushing-like cap 27 which is secured to the top of a hollow cylindrical stylus rod 28. As will be explained hereinafter, the lower surfaces of the inner ends of the feelers engage the upper surface of cap 27. In the locked or feeler-retracted position illustrated in Fig. 1, the upper surface of head 26 engages an internal undercut shoulder provided on cap 27, thus preventing downward movement of this cap and of the inner ends of the feelers. Thus, the feelers are held in the retracted position (out of contact with the wall of tubing string T) for running the caliper into the tubing string T preliminary to the surveying operation.

A centering plunger 36 is slidably mounted within the bore of body 19, and provides a lower bearing surface for spring 25. The lower end of plunger 36 is adapted to engage or contact the upper surfaces of the inner ends of the feelers 29. After the feelers are released to their tubing-contacting position, the action of spring 25 moves the centering plunger 36 downwardly with some force against the inner ends of the feelers 29, urging the latter outwardly against the wall of the tubing T with equal force, thus minimizing the errors which would arise due to the center line of the caliper moving away from the center line of the tubing string T.

The compression spring 25, pressing plunger 36 downwardly against the top of the feelers 29, produces a force through the latter against cap 27, which force is transmitted to head 26 in engagement with the shoulder under cap 27. In this manner, spring 25 exerts a downwardly directed force on rod 21 which tends to move this rod (and thereby also plunger 14, to which the rod is secured) downwardly within body 5 (and feeler body 19). When plunger 14 is released from the locked position illustrated in Fig. 1, this plunger, and also rod 21, move downwardly, causing head 26 to move away from cap 27 to an extent sufficient to permit the feelers to pivot so that their outer ends move outwardly to contact the tubing wall. This action will become clearer as the description proceeds.

There are a plurality of feelers arranged in generally circumferential fashion about the caliper, two of these feelers 29 being illustrated in the drawings. Each of the feelers is in the form of a bell crank with an inwardly extending arm 30 and a downwardly extending arm 31 pivoted by the pin 32. These pivoting pins are end ground to abut the adjoining pins as they rest in an annular groove (not shown) of the feeler body 19, and are consequently positioned securely in circumferential relation. The downwardly extending arm 31 of each feeler is provided with a hardened contact surface which is adapted to move into and out of corrosion pits in the tubing T. The inwardly extending arm 30 of each feeler is provided with a lower contacting surface which is adapted to engage the upper surface of cap 27 on the stylus rod 28.

The base 33 of a neck provided on the top of each inwardly extending arm 30 is designed to receive a corresponding feeler rod 34 which spring loads its respective feeler and normally pivots it outwardly to contact with the tubing. A feeler arm collar 35, provided with slots and counterbored, caps the feelers and the pivoting pins and holds them securely in place. To hold the collar 35 in place, it is secured to the lower end of a sleeve 37 whose upper end is received in and fastened to a shoulder at the lower end of a head nut 56. The internal threads at the upper end of nut 56 engage the external threads on feeler head body 19. Within the enclosed space defined by this sleeve and the feeler head body are housed the feeler actuating mechanisms and means to adjust their operating force.

The head nut 56 is cut away at 38 to provide a channel for receiving the upper ends of the spring guides 40 which are surrounded by the individual feeler operating springs 41. The upper ends of springs 41 engage the upper end of an annular groove 39 provided in feeler head body 19. Guides 40 serve as the only means of keeping the springs 41 from interfering with each other, as they are located in an annular space 39 with only small clearance between them. Near the lower ends of the spring guides 40, the collars 42, aligned radially by the sleeve 37, abut the lower ends of the springs 41, cause the guides to move downwardly against the feeler rods 34, and thus transmit the thrust to the feelers 29 and stylus cap 27. The feeler rods 34 are rounded at both the top and bottom to engage the lower ends of the spring guides 40 and to seat in the neck bases 33 on the inwardly extending arms 30 of the feelers 29.

It may be seen that each of the compression springs 41 exerts a downwardly directed force against its respective feeler rod 34, and through the feeler 29 and stylus cap 27 to head 26 (when the latter is in the feeler-retracted position shown in Figure 1); thus, springs 41 also exert a downwardly directed force against rod 21 which also tends to move rod 21 and plunger 14 downwardly within body 5 and feeler body 19. These feeler operating springs therefore also assist in the movement of plunger 14 downwardly when the latter is unlocked or released.

In addition, during the actual calipering operation springs 41 cause the downwardly extending arms 31 of the feelers to move outwardly into contact with the tubing wall against the restoring force of a stylus lift spring 43, and to move into and out of any corrosion pits therein. The stylus rod 28 is mounted for axial movement in response to calipering (inward and outward) movements of the feelers, the stylus cap 27 being engaged by the inwardly extending arms 30 of the feelers. The arrangement here is generally similar to that described in the aforementioned Fredd United States Patent 2,708,316.

A sleeve 44 is slidably mounted on the outside of body 5. This sleeve can slide on the body between the lower end of fishing neck 1 and the downwardly and outwardly sloped external shoulder 45 of the body. Two short diametrically-opposed slots 46 and 47 are cut through the sleeve 44, these slots opening to the upper end of the sleeve and extending downwardly for a short distance to provide a lower edge, at the end of each slot. When the sleeve 44 is in the position shown in Figure 1, the ends of the pin 17 extend into the slots 46 and 47; also, the wall of the sleeve encircles and engages the balls 12 and 13, causing these balls to extend into the groove 18 of the plunger, thus securing the plunger 14 in the position shown in Figure 1. Sleeve 44 has an internal annular groove 48 therein, this groove extending over a portion only of the length of the sleeve.

A tubular cup-shaped flexible member 49, closed and impervious to fluid at the bottom but opening upwardly, surrounds a portion of sleeve 44 to form an annular space 50 therebetween, opening upwardly. An annular base portion 51 of the cup closes the lower end of the annular space 50 and enables the cup to be secured to sleeve 44. A nut 52, having internal threads to engage the external threads at the bottom of sleeve 44, secures the flanged inner surface of annular base portion 51 to the sleeve 44 by forcing such flanged surface against a downwardly-facing shoulder provided on the sleeve.

To prepare the release assembly herein described and the tubing caliper for use, the feelers 29 are retracted inwardly by means of a retraction tool in the form of a bell-shaped sleeve. This sleeve is slid downwardly over the outside of the feeler head assembly, before the feeler head 19 is threaded into the lower end of body 5. The inward movement of the downwardly-extending arms 31 of the feelers 29 moves the feelers about their pivots in such a way that the inwardly-extending arms 30 of the feelers move essentially upwardly, away from the top of cap 27. This releases the rod 28, as well as the release rod 21, for movement upwardly.

Next, the body 5 is screwed onto the feeler head 19 and is secured thereto by tightening set screw 20. The upper end of release rod 21 is inserted into the longitudinal bore of the plunger 14 an amount such that the rod head 26 engages the shoulder under stylus cap 27, with the feelers 29 still held in the retracted position by means of the retraction tool. At this time, the sleeve 44 is in the position illustrated in Fig. 1, with the sleeve wall engaging the balls 12 and 13 and forcing these balls into the groove 18 of the plunger. Rod 21 is then secured in the lower end of plunger 14 by tightening set screws 22 and 23. To permit tightening of such set screws, a suitable access slot 53 is provided in body 5, in line with set screw 22, and another access slot 54 is provided in body 5, in line with set screw 23.

The retraction tool referred to may then be removed from the feelers, the relative dimensions being such that this tool may be slid up over member 49 while holding sleeve 44 in place. The retraction tool is thus removed from the tubing caliper. The feelers 29 are then held in the retracted position due to the engagement of rod head 26 with the shoulder under stylus cap 27, and the engagement of the latter with the inwardly-extending arms 30 of the feelers. The release rod 21 is in turn secured to the plunger 14 by means of set screws 22 and 23, and downward movement of the plunger with respect to body 5 is prevented by the engagement of the balls 12 and 13 in the groove 18 of the plunger (these balls, of course, also engaging body 5), this engagement being brought about by the wall of sleeve 44 engaging the balls.

If the feelers are released, accidentally or otherwise, by moving the sleeve 44 downwardly on body 5 until annular groove 48 is positioned outwardly of balls 12 and 13 (thus allowing the balls to move partially outwardly into groove 48 and out of groove 18, and so releasing the plunger 14 and release rod 21 for downward movement), the release assembly may be recocked in a manner now to be described. First, the feelers are retracted with a retraction tool. Then, with balls 12 and 13 partially disposed in the sleeve groove 48 as stated, sleeve 44 is rotated slightly so that, when moved upwardly, the upper end thereof will engage the outwardly extending ends of pin 17, to prevent entry of the pin into, and downward movement of the pin in, slots 46 and 47. In this way, premature locking together of the plunger 14 and body 5 is avoided, by keeping sleeve groove 48 outwardly of balls 12 and 13. Now, the sleeve 44 is moved upwardly until the upper end thereof engages pin 17, and with continued upward movement of the sleeve the pin 17 (and hence also plunger 14, to which the pin is secured) is forced upwardly until such pin engages the lower end of the fishing neck 1. At this time, balls 12 and 13 remain partially disposed in the sleeve groove 48, and the downwardly directed force within the feeler head assembly tends to move plunger 14 downwardly in body 5. Now, sleeve 44 is rotated in the opposite direction and in the same motion is forced upwardly until its upper end engages the lower end of fishing neck 1; at this time, pin 17 enters the slots 46 and 47, and moves downwardly within the same (considered another way, the slots 46 and 47 move upwardly with respect to pin 17). As the sleeve 44 moves upwardly, the downwardly and inwardly sloping surface which forms the lower edge of sleeve groove 48 forces the balls 12 and 13 inwardly into groove 18.

In this position, the balls 12 and 13 cannot move outwardly, due to their being encircled and tightly engaged by the non-grooved surface of sleeve 44, and the force acting on plunger 14 tending to move it downwardly in body 5 (i.e., the force due to springs 25, 41, etc.) is transmitted from the upper face of groove 18 through the rigid balls 12 and 13 to body 5, which is rigidly secured to the feeler head 19 of the tubing caliper and is therefore stationary with respect thereto. However, if sleeve 44 is moved downwardly with respect to body 5, to a position such that sleeve groove 48 is disposed outwardly of the balls, the downward force acting on the plunger 14 will cam the balls 12 and 13 (by means of the upwardly and outwardly sloping surface at the upper edge of groove 18) outwardly into groove 48. The moving of the balls outwardly into groove 48 releases or unlocks the plunger 14 from body 5. This will permit the plunger 14 to move downwardly in body 5, with consequent downward movement of feeler release rod 21.

Figure 1 illustrates the relative positions of the various parts in the feeler-retracted position, wherein the caliper is ready to be run into the tubing string. The plunger 14, and feeler release rod 21 secured thereto, are now locked in their upper position, by means of balls 12 and 13 in the plunger groove 18. The head 26 at the lower end of rod 21 engages the shoulder under stylus cap 27, holding the inwardly extending arms 30 of the feelers in their uppermost position and pivoting the downwardly extending arms 31 thereof inwardly, to the feeler-retracted position.

With the parts in the position shown in Figure 1, a wire line assembly may be connected at 2 to the release assembly, following which the tubing caliper is run into the tubing string until the desired level therein is reached.

In order for the release assembly of this invention to operate as desired, it is essential that the length of tubing to be calipered contain a fluid of some sort. This is no drawback, however, since well tubings being calipered almost invariably contain fluid of one kind or another.

As the tubing caliper is run downwardly into the tubing string T, the caliper becomes submerged in at least several feet of fluid. This fluid enters into the annular space 50 defined by cup member 49 and that portion of the sleeve 44 co-extensive therewith. When the desired level in the tubing string is reached, the downward movement of the caliper is stopped, and following this, the caliper is rapidly moved upwardly. The inertia of the fluid tends to prevent cup 49 from moving upwardly with the rest of the caliper. Therefore, as the rest of the caliper moves upwardly, sleeve 44, to which cup 49 is firmly attached, is in effect forced to move downwardly with respect to body 5, to a position wherein sleeve groove 48 is disposed outwardly of the balls 12 and 13. This tendency of the well fluid to resist being lifted by the cup, a function called swabbing in oil field terminology, provides the necessary force to move sleeve 44 downwardly on body 5. During this initial upward movement of the caliper, or during subsequent upward movement, the flexible cup 49 will be rolled over its base portion 51, so that its open end is then pointed downwardly, as illustrated in Figure 2. This rolling over of the cup on itself, to a position wherein its open end is pointed downwardly, is a desirable feature of the invention. Swabbing of the tubing, as the caliper is drawn upwardly, is obviated, so that the caliper may be easily drawn out of the tubing.

As previously explained, when groove 48 is disposed outwardly of the balls, the force acting downwardly on plunger 14 causes the plunger to move downwardly, camming the balls 12 and 13 outwardly into groove 48. This moving of the balls outwardly releases or unlocks the plunger 14, permitting the latter to move downwardly in body 5 until the lower surface of the enlarged portion 15 of the plunger contacts the upper end of feeler head body 19.

Once the plunger 14 is released or unlocked, the resultant force acting downwardly on the plunger causes the same, along with release rod 21 secured thereto, to move downwardly. This causes rod head 26 to become disengaged from the shoulder under stylus rod cap 27 and to move downwardly within the hollow stylus rod 28 to an extent sufficient to release the stylus rod 28 and the inwardly extending arms 30 of the feelers for free downward movement, the downwardly extending arms 31 of the feelers then pivoting outwardly to engage the tubing wall. The feelers are then in the feeler-extended position. The downward movement of the inner ends of the feelers and of the stylus rod is limited by the contact of the outer ends of the feelers with the tubing wall. The rod head 26 moves downward an amount sufficient to prevent any possible interference thereof with the axial movement of the stylus rod 28 or of the cap 27 during the calipering operation.

Figure 2 illustrates the relative positions of the various parts in the feeler-extended position, that is, in the position occupied during the withdrawal from the hole for the actual calipering operation. The cup 49 is shown in the rolled-over position, with its open end pointed downwardly, which position it occupies during the calipering or withdrawal operation.

The release assembly has now performed its function, and serves, during the remainder of the calipering operation, merely to retract the caliper from the tubing string T as the wire line assembly is pulled upwardly. In this connection, it will be noted that a portion of plunger 14 now engages the body 19 secured to body 5, causing the plunger 14 to be drawn upwardly with body 5, that sleeve 44 now engages the external shoulder 45 of the body, causing the sleeve to be drawn upwardly with the body, and that the body itself is threadedly secured to the fishing neck 1.

Unless cup 49 has been damaged during the operation described, it can be repositioned on the sleeve 44 as illustrated in Figure 1, and can be used again for the same purpose.

It is desired to be pointed out that no part of the release assembly of the invention need engage the tubing wall or tubing joints, in order to release the feelers for movement into feeler-extended position. Also, during downward movement of the caliper into the tubing string, the calipering feelers are positively locked in a feeler-retracted position, through the action of balls 12 and 13, which then ride in groove 18 to lock together plunger 14 and body 5. In addition, the rolling over of the cup 49, after release of the mechanism to feeler-extended position, eliminates any drag (which might otherwise result from swabbing of the hole) during the upward movement of the caliper.

The invention claimed is:

1. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, and inertially-operated means responsive to a sudden upward pull thereof through the fluid in said tubing for releasing said locking means, thereby to allow movement in said predetermined direction of said plunger with respect to said body member and a consequent movement of said feelers to the feeler-extended position.

2. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, a release member for releasing said locking means, and means responsive to a sudden upward pull thereof through the fluid in said tubing for operating said release member, thereby to release said locking means and allow movement in said predetermined direction of said plunger with respect to said body member.

3. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, a release member slidably mounted on said body member, said release member operating to release said locking means in response to sliding movement of such release member, and means responsive to a sudden upward pull thereof through the fluid in said tubing for causing sliding movement of said release member, thereby to release said locking means and allow movement in said predetermined direction of said plunger with respect to said body member.

4. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, a release member mounted for movement on said body member, said release member operating to release said locking means in response to movement of said release member with respect to said body member, and an impervious cup-shaped member fixedly secured to the outside of said release member, the open end of said cup-shaped member facing upwardly in the original position of said mechanism, wherein said feelers are in the feeler-retracted position.

5. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, a release member slidably mounted on said body member, said release member operating to release said locking means in response to sliding movement of such release member, and an impervious cup-shaped member fixedly secured at its base to the outside of said release member, the open end of said cup-shaped member facing upwardly in the original position of said mechanism, wherein said feelers are in the feeler-retracted position.

6. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid member mounted in said body member and adapted to be moved into and out of engagement with said plunger, the engagement of said rigid member with said plunger operating to lock together said plunger and said body member and the disengagement of said rigid member from said plunger operating to release said plunger for movement in said predetermined direction with respect to said body member, means for originally maintaining said rigid member in engagement with said plunger, said last-named means being movable to permit said rigid member to move out of engagement with said plunger, and inertially-operated means responsive to a sudden upward pull thereof through the fluid in said tubing for moving said maintaining means, thereby to release said plunger for movement in said predetermined direction with respect to said body member.

7. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid member mounted in said body member and adapted to be moved into and out of engagement with said plunger, the engagement of said rigid member with said plunger operating to lock together said plunger and said body member and the disengagement of said rigid member from said plunger operating to release said plunger for movement in said predetermined direction with respect to said body member, a sleeve slidably mounted on said body member, said sleeve originally being in a position wherein it engages said rigid member to maintain the latter in engagement with said plunger but being slidable to a position wherein it permits said rigid member to move out of engagement with said plunger, and means responsive to a sudden upward pull thereof through the fluid in said tubing for causing sliding movement of said sleeve, thereby to release said plunger for movement in said predetermined direction with respect to said body member.

8. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid member mounted in said body member and adapted to be moved into and out of engagement with said plunger, the engagement of said rigid member with said plunger operating to lock together said plunger and said body member and the disengagement of said rigid member from said plunger operating to release said plunger for movement in said predetermined direction with respect to said body member, a member mounted for movement on said body member, said last-mentioned member originally being in a position wherein it engages said rigid member to maintain the latter in engagement with said plunger but being movable to a position wherein it permits said rigid member to move out of engagement with said plunger, and an impervious cup-shaped member fixedly secured to the outside of said last-mentioned member, the open end of said cup-shaped member facing upwardly in the original position of said mechanism, wherein said feelers are in the feeler-retracted position.

9. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid member mounted in said body member and adapted to be moved into and out of engagement with said plunger, the engagement of said rigid member with said plunger operating to lock together said plunger and said body member and the disengagement of said rigid member from said plunger operating to release said plunger for movement in said predetermined direction with respect to said body member, a sleeve slidably mounted on the outside of said body member, said sleeve originally being in a position wherein it engages said rigid member to maintain the latter in engagement with said plunger but being slidable to a position wherein it permits said rigid member to move out of engagement with said plunger, and an impervious cup-shaped member fixedly secured at its base to the outside of said sleeve, the open end of said cup-shaped member facing upwardly in the original position of said mechanism, wherein said feelers are in the feeler-retracted position.

10. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid ball mounted in said body member and adapted to be moved into and out of a groove in said plunger, the moving of said ball into said groove operating to lock together said plunger and said body member and the moving of said ball out of said groove operating to release said plunger for movement in said predetermined direction with respect to said body member, a sleeve slidably mounted on the outside of said body member, said sleeve having an internal groove extending over a portion only of its length, said sleeve originally being in a position wherein the ungrooved portion thereof engages said ball to maintain the latter within the plunger groove but being slidable to a position wherein the grooved portion thereof is adjacent said ball so that the latter is free to move out of the plunger groove and into the sleeve groove, and inertially-operated means responsive to a sudden upward pull thereof through the fluid in said tubing for causing sliding movement of said sleeve to a position wherein the grooved portion thereof is adjacent said ball.

11. A mechanism as defined in claim 10, and including also stop means for limiting the movement of said plunger in said predetermined direction.

12. In an internal tube wall calipering and recording device adapted to be passed through an extended length of tubing containing fluid, said device including a plurality of feelers mounted for movement from a feeler-retracted position out of contact with the tubing wall to a feeler extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid ball mounted in said body member and adapted to be moved into and out of a groove in said plunger, the moving of said ball into said groove operating to lock together said plunger and said body member and the moving of said ball out of said groove operating to release said plunger for movement in said predetermined direction with respect to said body member, a sleeve slidably mounted on the outside of said body member, said sleeve having an internal groove extending over a portion only of its length, said sleeve originally being in a position wherein the ungrooved portion thereof engages said ball to maintain the latter within the plunger groove but being slidable to a position wherein the grooved portion thereof is adjacent said ball so that the latter is free to move out of the plunger groove and into the sleeve groove, and an impervious cup-shaped member fixedly secured to the outside of said sleeve, the open end of said cup-shaped member facing upwardly in the original position of said mechanism, wherein said feelers are in the feeler-retracted position.

13. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, a release member mounted for movement on said body member, said release member operating to release said locking means in response to movement of said release member with respect to said body member, and an impervious cup-shaped member fixedly secured to the outside of said release member, the open end of said cup-shaped member facing upwardly in the original position of said mechanism, wherein said feelers are in the feeler-retracted position, said cup-shaped member having sufficient flexibility to roll over on itself, so that its open end faces downwardly, in response to an upward pull on said mechanism through the fluid in said tubing.

14. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, locking means for originally locking together said plunger and said body member, a release member slidably mounted on said body member, said release member operating to release said locking means in response to sliding movement of such release member, and an impervious cup-shaped member fixedly secured at its base to the outside of said release member, the open end of said cup-shaped member facing upwardly in the original position of said mechanism, wherein said feelers are in the feeler-retracted position, said cup-shaped member having sufficient flexibility to roll over on itself, so that its open end faces downwardly, in response to an upward pull on said mechanism through the fluid in said tubing.

15. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid member mounted in said body member and adapted to be moved into and out of engagement with said plunger, the engagement of said rigid member with said plunger operating to lock together said plunger and said body member and the disengagement of said rigid member from said plunger operating to release said plunger for movement in said predetermined direction with respect to said body member, a member mounted for movement on said body member, said last-mentioned member originally being in a position wherein it engages said rigid member to maintain the latter in engagement with said plunger but being movable to a position wherein it permits said rigid member to move out of engagement said said plunger, and an impervious cup-shaped member fixedly secured to the outside of said last-mentioned member, the open end of said cup-shaped member facing upwardly in the original position of said mechanism, wherein said feelers are in the feeler-retracted position, said cup-shaped member having sufficient flexibility to roll over on itself, so that its open end faces downwardly, in response to an upward pull on said mechanism through the fluid in said tubing.

16. In an internal tube wall calipering and recording device adapted to be passed through an extended length of tubing containing fluid, said device including a plurality of feelers mounted for movement from a feeler-retracted position out of contact with the tubing wall to a feeler-extended position for contact with the tubing wall: a mechanism for releasing said feelers for movement from the feeler-retracted position to the feeler-extended position comprising a bored body member adapted to be secured to the feeler head assembly, a plunger mounted for sliding movement within said body member, a feeler controlling member secured to said plunger, said controlling member permitting movement of said feelers to a feeler-extended position in response to movement in a predetermined direction of said plunger with respect to said body member, a rigid ball mounted in said body member and adapted to be moved into and out of a groove in said plunger, the moving of said ball into said groove operating to lock together said plunger and said body member and the moving of said ball out of said groove operating to release said plunger for movement in said predetermined direction with respect to said body member, a sleeve slidably mounted on the outside of said body member, said sleeve having an internal groove extending over a portion only of its length, said sleeve originally being in a position wherein the ungrooved portion thereof engages said ball to maintain the latter within the plunger groove but being slidable to a position wherein the grooved portion thereof is adjacent said ball so that the latter is free to move out of the plunger groove and into the sleeve groove, and an impervious cup-shaped member fiixedly secured to the outside of said sleeve, the open end of said cup-shaped member facing upwardly in the original position of said mechanism, wherein said feelers are in the feeler-retracted position, said cup-shaped member having sufficient flexibility to roll over on itself, so that its open end faces downwardly, in response to an upward pull on said mechanism through the fluid in said tubing.

References Cited in the file of this patent
UNITED STATES PATENTS

| | | |
|---|---|---|
| 2,415,636 | Johnson | Feb. 11, 1947 |
| 2,630,632 | Brandon | Mar. 10, 1953 |
| 2,708,316 | Fredd | May 17, 1955 |